United States Patent
Shahrzad et al.

(10) Patent No.: US 10,025,700 B1
(45) Date of Patent: Jul. 17, 2018

(54) DATA MINING TECHNIQUE WITH N-POOL EVOLUTION

(71) Applicant: SENTIENT TECHNOLOGIES (BARBADOS) LIMITED, Belleville (BB)

(72) Inventors: Hormoz Shahrzad, Dublin, CA (US); Kaivan Kamali, State College, PA (US); Babak Hodjat, Dublin, CA (US); Daniel Edward Fink, Berkeley, CA (US)

(73) Assignee: SENTIENT TECHNOLOGIES (BARBADOS) LIMITED, Belleville (BB)

( * ) Notice: Subject to any disclaimer, the term of this patent is extended or adjusted under 35 U.S.C. 154(b) by 292 days.

(21) Appl. No.: 15/071,016

(22) Filed: Mar. 15, 2016

Related U.S. Application Data

(63) Continuation-in-part of application No. 13/945,630, filed on Jul. 18, 2013, now Pat. No. 9,304,895.
(Continued)

(51) Int. Cl.
*G06F 11/36* (2006.01)
*G06F 17/30* (2006.01)

(52) U.S. Cl.
CPC ...... *G06F 11/3692* (2013.01); *G06F 11/3668* (2013.01); *G06F 17/30539* (2013.01)

(58) Field of Classification Search
CPC ............. G06F 11/3668; G06F 11/3672; G06F 11/3676; G06F 11/3692
(Continued)

(56) References Cited

U.S. PATENT DOCUMENTS 5,845,266 A    12/1998   Lupien et al.
5,920,848 A     7/1999   Schutzer et al.
(Continued)

FOREIGN PATENT DOCUMENTS

EP     2422276 A1    2/2012
EP     2422278 A1    2/2012
(Continued)

OTHER PUBLICATIONS

Gaspar-Cunha, A. et al., "A Multi-Objective Evolutionary Algorithm Using Neural Networks to Approximate Fitness Evaluations," Int'l J. Computers, Systems and Signals, 6(1) 2005, pp. 18-36.
(Continued)

*Primary Examiner* — Thu-Nguyet Le
(74) *Attorney, Agent, or Firm* — Haynes Beffel & Wolfeld LLP

(57) ABSTRACT

Roughly described, a training database contains N segments of data samples. Candidate individuals identify a testing experience level, a fitness estimate, a rule set, and a testing set $TS_i$ of the data samples on which it is tested. The testing sets have fewer than all of the data segments and they are not all the same. Testing involves testing on only the individual's assigned set of data segments, updating the fitness estimates and testing experience levels, and discarding candidates through competition. If an individual reaches a predetermined maturity level of testing experience, then validating involves further testing it on samples of the testing data from a testing data segment other than those in the individual's testing set $TS_i$. Those individuals that satisfy validation criteria are considered for deployment.

31 Claims, 8 Drawing Sheets

Related U.S. Application Data

(60) Provisional application No. 61/672,958, filed on Jul. 18, 2012.

(58) Field of Classification Search
USPC .................................................. 717/142
See application file for complete search history.

(56) References Cited

U.S. PATENT DOCUMENTS

| | | | |
|---|---|---|---|
| 6,240,399 | B1 | 5/2001 | Frank et al. |
| 6,249,783 | B1 | 6/2001 | Crone et al. |
| 7,013,344 | B2 | 3/2006 | Megiddo |
| 7,370,013 | B1 | 5/2008 | Aziz et al. |
| 7,444,309 | B2 | 10/2008 | Branke et al. |
| 8,527,433 | B2 | 9/2013 | Hodjat et al. |
| 8,909,570 | B1 * | 12/2014 | Hodjat ................ G06N 3/126 706/13 |
| 2002/0019844 | A1 | 2/2002 | Kurowski et al. |
| 2004/0210545 | A1 | 10/2004 | Branke et al. |
| 2004/0254901 | A1 | 12/2004 | Bonabeau et al. |
| 2005/0033672 | A1 | 2/2005 | Lasry et al. |
| 2005/0187848 | A1 | 8/2005 | Bonissone et al. |
| 2005/0198103 | A1 | 9/2005 | Ching |
| 2007/0143198 | A1 | 6/2007 | Brandes et al. |
| 2007/0143759 | A1 | 6/2007 | Ozgur et al. |
| 2007/0185990 | A1 | 8/2007 | Ono et al. |
| 2008/0071588 | A1 | 3/2008 | Eder |
| 2008/0228644 | A1 | 9/2008 | Birkestrand et al. |
| 2009/0125370 | A1 * | 5/2009 | Blondeau ............ G06F 9/5066 705/7.27 |
| 2009/0307638 | A1 | 12/2009 | McConaghy |
| 2010/0030720 | A1 | 2/2010 | Stephens |
| 2010/0182935 | A1 | 7/2010 | David |
| 2010/0274736 | A1 * | 10/2010 | Hodjat ................ G06N 3/126 705/36 R |
| 2010/0274742 | A1 | 10/2010 | Hodjat et al. |
| 2010/0293119 | A1 | 11/2010 | Ferringer et al. |
| 2011/0161264 | A1 | 6/2011 | Cantin |
| 2011/0246834 | A1 | 10/2011 | Rajashekara et al. |
| 2012/0239517 | A1 | 9/2012 | Blondeau et al. |
| 2013/0124440 | A1 | 5/2013 | Hodjat et al. |
| 2013/0254142 | A1 | 9/2013 | Hodjat et al. |
| 2014/0006316 | A1 | 1/2014 | Hodjat et al. |
| 2016/0283563 | A1 | 9/2016 | Hodjat et al. |

FOREIGN PATENT DOCUMENTS

| | | | |
|---|---|---|---|
| JP | 08-110804 | A | 4/1996 |
| JP | 2001325041 | A | 11/2001 |
| JP | 2003044665 | A | 2/2003 |
| JP | 2004240671 | A | 8/2004 |
| JP | 2004302741 | A | 10/2004 |
| JP | 2007207173 | A | 8/2007 |
| JP | 2007522547 | A | 8/2007 |
| WO | 2005073854 | A2 | 8/2005 |
| WO | 2010127039 | A1 | 11/2010 |
| WO | 2010127042 | A1 | 11/2010 |

OTHER PUBLICATIONS

Kosorukoff, A. "Using incremental evaluation and adaptive choice of operators in a genetic algorithm," Proc. Genetic and Evolutionary Computation Conference, GECCO—Sep. 2002, 7pp.

Nelson, A. "Fitness functions in evolutionary robotics: A survey and analysis," Robotics and Autonomous Systems 57 (Apr. 30, 2009) 345-370.

Bongard, J. C. et al., "Guarding Against Premature Convergence while Accelerating Evolutionary Search", GECCO'10: Proceedings of the 12th annual conference on Genetic and Evolutionary Computation, 8 pages (2010).

Wu, A.S. et al., "An incremental fitness function for partitioning parallel taks," Proc. Genetic and Evolutionary Computation Conf. (Aug. 2001) 8pp.

Whitehead, B.A. "Genetic Evolution of Radial Basis Function Coverage Using Orthogonal Niches," IEEE Transactions on Neural Networks, 7:6, (Nov. 1996) 1525-28.

Bui, L.T. et al., "Local models: An approach to distributed multi-objective optimization," Computational Optimization and Applications, vol. 42, No.1, Oct. 2007, pp. 105-139.

Castillo, Tapia, et al., "Applications of multi-objective evolutionary algorithms in economics and finance: A survey," Proc. IEEE Congress on Evolutionary Computation, Sep. 2007, pp. 532-539.

Ducheyne, E. et al., "Is Fitness Inheritance Useful for Real-World Applications?" Evolutionary Multi-Criterion Optimization, ser. LNCS 2631, Spring 2003, pp. 31-42.

Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.

Juille, H. "Evolution of Non-Deterministic Incremental Algorithms as a New Approach for Search in State Spaces," Proc. 6th Int'l Conf. on Genetic Algorithms, 1995, 8pp.

Hornby, G.S., "A Steady-State Version of the Age-Layered Population Structure EA," Chapter 1 of Genetic Programming Theory and Practice VII, Riolo et al., editors, Springer 2009, 16pp.

Hornby, G.S., "ALPS: The Age-Layered Population Structure for Reducing the Problem of Premature Convergence," GECCO'06, Seattle, Jul. 2006, authored by an employee of the US Government, therefore in the public domain, 8pp.

Hornby, G.S., "Steady-State ALPS for Real-Valued Problems," GECCO'09, Montreal, Jul. 2009, Assoc. for Computing Machinery, 8pp.

Idesign lab, "ALPS—the Age-Layered Population Structure," UC Santa Cruz web article printed Mar. 17, 2011, 3 pp. (http://idesign.ucsc.edu/projects/alps.html).

International Search Report dated Jul. 2, 2010 in PCT/US10/32847.
International Search Report dated Jun. 29, 2010 in PCT/US10/32841.

Sacks, J. et al. "Design and Analysis of Computer Experiments," Statistical Science 4:4, 1989, 409-435.

Torresen, J. "A Dynamic Fitness Function Applied to Improve the Generalisation when Evolving a Signal Processing Hardware Architecture," Proc. EvoWorkshops 2002, 267-299 (12 pp).

Bartlett II, J.E. et al., "Organizational Research: Determining Appropriate Sample Size in Survey Research," IT, Learning, and Performance Journal 19(1) Spring 2001, 8pp.

Fitzpatrick, J.M. et al., "Genetic Algorithms in Noisy Environments," Machine Learning 3: 101-120, May 1988.

JP 2010-533295, Office Action dated Apr. 16, 2013, 3 pages.

Koza, J.R., "Genetic Programming: On the Programming of Computers by Means of Natural Selection", Dec. 1992, MIT Press, pp. 1-609.

León C. et al., "Parallel hypervolume-guided hyperheuristic for adapting the multi-objective evolutionary island model," Proc. 3rd Int'l Workshop on Nature Inspired Cooperative Strategies for Optimization Studies in Computational Intelligence, vol. 236, Nov. 2008, pp. 261-272.

López Jaimes A. et al., "MRMOGA: Parallel evolutionary multiobjective optimization using multiple resolutions," Proc. IEEE Congress on Evolutionary Computation, vol. 3, Sep. 2005, pp. 2294-2301.

Davarynejad, M. et al., "A Novel General Framework for Evolutionary Optimization: Adaptive Fuzzy Fitness Granulation," CEC Sep. 2007, 6pp.

Davarynejad, M. "Fuzzy Fitness Granulation in Evolutionary Algorithms for complex optimization," Master of Science Thesis, Ferdowsi Univ. of Mashhad, Jun. 2007, 30pp.

Salami, M. et al., "A fast evaluation strategy for evolutionary algorithms," Applied Soft Computing 2/3F (Jan. 2003) 156-173.

Akbarzadeh-T., M.-R, et al., "Friendship Modeling for Cooperative Co-Evolutionary Fuzzy Systems: A Hybrid GA-GP Algorithm," Proc. 22nd Int'l Conf. of N. American FIPS, Jul. 2003, pp. 61-66.

(56) References Cited

OTHER PUBLICATIONS

Mouret, J.B. et al., "Encouraging Behavioral Diversity in Evolutionary Robotics: An Empirical Study," MIT, Evolutionary Computation 20(1):91-133, 2012.
Myers, Raymond H. and Montgomery, Douglas C., Response Surface Methodology: Process and Product Optimization Using Designed Experiments, John Wiley and Sons, Inc., New York, 1995, 12 pages.
Poli R et al., "Genetic Programming: An introductory Tutorial and a Survey of Techniques and Applications," Univ. Essex School of Computer Science and Eletronic Engineering Technical Report No. CES-475, Oct. 2007, pp. 1-112.
Georgilakis, P.S. "Genetic Algorithm Model for Profit Maximization of Generating Companies in Deregulated Electricity Markets", Applied Artificial Intelligence, Jul. 2009, 23:6,538-552.
Refaeilzadeh, P. et al., "Cross Validation" entry, Encyclopedia of Database Systems, eds. Özsu and Liu, Springer, 2009, 6pp.
Remde, S. et al. "Evolution of Fitness Functions to Improve Heuristic Performance," LION Dec. 8-10, 2007 II, LNCS 5313 pp. 206-219.
Sakauchi et al., UNIFINE: A Next Generation Financial Solution System of Nihon Unisys Ltd., Technology Review UNISYS, Japan, Nihon Unisys Ltd., Feb. 28, 2006, vol. 25, No. 4, 5 pages.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, Sep. 20-24, 2004, pp. 421-424.
Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/Introduction to E volutionary Algorithms.pdf).
Tanev, I. et al., "Scalable architecture for parallel distributed implementation of genetic programming on network of workstations," J. Systems Architecture, vol. 47, Jul. 2001, pp. 557-572.
Laumanns, Marco et al.; "A Unified Model for Multi-Objective Evolutionary Aigorithms with Elitism"; 2000; IEEE; pp. 46-53.
Ahn, Chang Wook et al.; "Elitism-Based Compact Genetic Aigorithms"; 2003; IEEE; Transactions on Evolutionary Computation, vol. 7, No. 4; pp. 367-385.
U.S. Appl. No. 13/184,307—Office Action dated Oct. 21, 2013, 16 pages.
Hornby, Gregory S.,"The Age-Layered Population Structure (ALPS) Evolutionary Algorithm," ACM; GECCO Jul. 8-12, 2009; 7 pages.
U.S. Appl. No. 13/358,381—Office Action dated Jul. 8, 2014, 30 pages.
Freitas, A., "A review of evolutionary algorithms for data mining." Soft Computing for Knowledge Discovery and Data Mining, Springer US, 2008, pp. 79-111.
U.S. Appl. No. 13/540,507—Office Action dated Sep. 9, 2014, 25 pages.
U.S. Appl. No. 13/184,307—Notice of Allowance dated Aug. 4, 2014, 9 pages.
U.S. Appl. No. 13/184,307—Office Action dated Mar. 21, 2014, 36 pages.
U.S. Appl. No. 13/945,630—Office Action dated Mar. 12, 2015, 28 pages.
U.S. Appl. No. 13/540,507—Notice of Allowance and Fee(s) Due, dated Oct. 31, 2014, 19 pages.
U.S. Appl. No. 13/540,507—Response to Office Action dated Sep. 9, 2014 filed Oct. 15, 2014, 20 pages.
U.S. Appl. No. 13/358,381—Notice of Allowance and Fee(s) Due, dated Nov. 19, 2014, 5 pages.
U.S. Appl. No. 13/358,381—Response to Office Action dated Jul. 8, 2014 filed Oct. 3, 2014, 20 pages.
U.S. Appl. No. 13/184,307—Response dated Jun. 23, 2014, 32 pages.
U.S. Appl. No. 13/184,307—Response dated Jan. 22, 2014, 19 pages.
U.S. Appl. No. 13/943,630—Office Action dated May 27, 2015, 42 pages.
U.S. Appl. No. 13/945,630—Final Office Action dated Aug. 4, 2015, 22 pages.
U.S. Appl. No. 13/945,630—Resonse to Office Action dated Mar. 12, 2015 filed Jul. 13, 2015, 9 pages.
U.S. Appl. No. 13/358,381—Amendment After Allowance filed Feb. 13, 2015, 20 pages.
U.S. Appl. No. 13/943,630—Response to Office Action dated May 27, 2015 filed Sep. 23, 2015, 8 pages.
U.S. Appl. No. 14/539,908—Office Action dated Oct. 1, 2015, 33 pages.
U.S. Appl. No. 13/945,630—Response to Final Office Action dated Aug. 4, 2015 filed Nov. 4, 2015, 12 pages.
U.S. Appl. No. 13/945,630—Notice of Allowance dated Nov. 18, 2015, 8 pages.
U.S. Appl. No. 13/943,630—Notice of Allwoance dated Jan. 21, 2016, 28 pages.
U.S. Appl. No. 14/539,908—Response to Office Action dated Oct. 1, 2015 filed Feb. 1, 2016, 18 pages.
Hodjat et al., "Chapter 5: Introducing an Age-Varying Fitness Estimation Function." Genetic Programming Theory and Practice X. Ed. Riolo et al., Springer Apr. 19, 2013, pp. 59-71.
Hodjat et. al., "nPool: Massively Distributed Simultaneous Evolution and Cross-Validation in EC-Star", ppt at GPTP May 2015, 16 pages.
Hodjat et. al., "nPool: Massively Distributed Simultaneous Evolution and Cross-Validation in EC-Star," Sentient Technologies, May 2015, pp. 1-12.
U.S. Appl. No. 15/179,801—Office Action dated Nov. 25, 2016, 24 pages.
U.S. Appl. No. 14/539,908—Notice of Allowance dated Mar. 17, 2016, 5 pages.
U.S. Appl. No. 13/943,630—Notice of Allowability dated May 19, 2016, 2 pages.
U.S. Appl. No. 13/943,630—Amendment After Allowance dated Mar. 15, 2016, 16 pages.
U.S. Appl. No. 13/945,630—Amendmend After Allowance dated Dec. 9, 2015, 7 pages.
U.S. Appl. No. 15/179,801—Response to Office Action dated Nov. 25, 2016 filed Feb. 24, 2017, 21 pages.
U.S. Appl. No. 15/179,801—Notice of Allowance dated May 19, 2017, 9 pages.

\* cited by examiner

DATA MINING TECHNIQUE WITH N-POOL EVOLUTION

CROSS-REFERENCE TO OTHER APPLICATIONS

This is a Continuation-In-Part of U.S. patent application Ser. No. 13/945,630, filed 18 Jul. 2013, entitled "Evolutionary Technique With n-Pool Evolution", which claims the benefit under 35 U.S.C. 119(e) of U.S. Provisional Application No. 61/672,958, filed 18 Jul. 2012, entitled "Data Mining Technique With n-Pool Evolution". Both applications are hereby incorporated by reference herein for their teachings.

U.S. Pat. No. 8,909,570, entitled "Data Mining Technique With Experience-Layered Gene Pool", is also incorporated herein for its teachings.

BACKGROUND

The invention relates generally to data mining, and more particularly, to the use of evolutionary algorithms to extract useful rules or relationships from a data set for use in controlling systems.

In many environments, a large amount of data can be or has been collected which records experience over time within the environment. Despite the large quantities of such data, or perhaps because of it, deriving useful knowledge from such data stores can be a daunting task. The process of extracting patterns from such data sets is known as data mining. Many techniques have been applied to the problem, but the present discussion concerns a class of techniques known as genetic algorithms, and their superset, evolutionary algorithms.

The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population are created, by putting together the building blocks, or alphabets, that form an individual. In genetic programming, the alphabets are a set of conditions and actions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

After testing, before harvesting, surviving individuals conventionally are often subjected to validation against an out-of-sample (i.e., previously unseen) test set. This is to ensure sufficient generalization of the evolved individuals, which may have data-fitted the testing samples.

SUMMARY

Cross-Validation is a common method of evaluating and comparing learning algorithms by dividing the database into two segments: one used to learn or train a model and the other used to validate the model. In typical cross-validation, the testing and validation sets must cross-over in successive rounds such that each data point has a chance of being validated against. One statistical form of cross-validation is k-fold cross-validation, which in some special cases involves repeated rounds of k-fold cross-validation.

In k-fold cross-validation the data is first partitioned into k equally (or nearly equally) sized segments or folds. Subsequently k iterations of testing and validation are performed such that within each iteration a different fold of the data is held-out for validation while the remaining k−1 folds are used for learning. Cross-validation is used to evaluate or compare learning algorithms as follows: in each iteration, one or more learning algorithms use k−1 folds of data to learn one or more models, and subsequently the learned models are asked to make predictions about the data in the validation fold. The performance of each learning algorithm on each fold can be tracked using some predetermined performance metric like accuracy. Upon completion, k samples of the performance metric will be available for each algorithm. Different methodologies such as averaging can be used to obtain an aggregate measure from these samples, or these samples can be used in a statistical hypothesis test to show that one algorithm is superior to another.

One difference between the data mining environments of the embodiments described herein, and many other environments in which evolutionary algorithms can be applied, is that the fitness of a particular individual in the present data mining environment usually cannot be determined by a single test of the individual on the data; rather, the fitness estimation itself tends to vary as it is trained on more and more samples in the testing database. The fitness estimate can be inaccurate as testing begins, and confidence in its accuracy increases as the individual experiences more samples.

The number of data samples (or an approximation thereof) on which a particular individual has been trained is sometimes referred to herein as the individual's testing experience level. Preferably individuals are not considered for harvesting until they have reached a predetermined testing experience level.

Though not required for all embodiments of the invention, in embodiments herein, an elitist pool is organized in such a way as to contain T layers numbered $L_1$–$L_T$, with T>1. The overall pool of candidate individuals also includes some that have not yet undergone sufficient numbers of tests to be considered for the elitist pool, and those individuals are considered herein to reside in a layer below the elitist pool, designed layer 0 ($L_0$). Each i'th one of the layers in [$L_0$ . . . $L_{T-1}$] contains only individuals with a respective range of testing experience [ExpMin($L_i$) . . . ExpMax($L_i$)], each ExpMin($L_{i+1}$)>ExpMax($L_i$). The minimum experience level of the bottom layer $L_0$ is 0, and the top layer $L_T$ has a minimum experience level ExpMin($L_T$) but no maximum experience level. Preferably, the experience ranges of layers are themselves contiguous, so that ExpMin($L_{i+1}$)=ExpMax($L_i$)+1, for 0<=i<T. Note that testing experience level is a significantly different basis on which to stratify individuals in an elitist pool than age in the sense of ALPS.

In an embodiment, each layer i in the elitist pool (i.e. in layers [$L_1 \ldots L_T$]) is permitted to hold a respective maximum number of individuals, Quota($L_i$). The quota is chosen to be small enough to ensure competition among the individuals within the corresponding range of experience levels, but large enough to ensure sufficient diversity among the fit individuals that graduate to the next higher layer. Preferably the quota of each such layer is fixed, but in another embodiment it could vary. The quota of layer $L_0$ is not chosen based on these criteria, since the individuals in that layer do not yet compete. Preferably the number of layers T in the elitist pool is also fixed, but in another embodiment it can vary.

As each individual gains more experience, assuming it is not displaced within its current experience layer, it will eventually graduate to the next higher experience layer. If the next higher experience layer is not yet full, then the individual is added to that layer. If it is full, then the individual has to compete for its place in that layer. If it is fitter than the least fit individual in that layer, it will be accepted into that layer and the least fit individual will be discarded. If not, then the graduating individual will be discarded and the individuals in the next higher layer will be retained.

Either way, a space is opened in the current experience layer (the layer from which the individual is graduating). The open space means that the next individual graduating into the current experience layer from below will be accepted without having to compete for its place—thereby defeating a purpose of the elitist pool. To mitigate this problem, an embodiment introduces the concept of an elitist pool minimum fitness, which in one embodiment is set to the minimum fitness of the top layer. The individuals in the top layer are assumed to have a relatively accurate estimate of their fitness, and since after the top layer is full the goal of the evolutionary algorithm is to identify individuals that are better than the ones already there, it makes sense to avoid devoting resources to individuals which already appear to be inferior. Thus in the embodiment, once the elitist pool minimum fitness is set, any individual being considered into the elitist pool can only be added if it has a fitness value above the elitist pool minimum fitness. Stated differently, once the top layer $L_T$ is full, individuals are not allowed to enter $L_1$ unless their fitness level is at least as high as the minimum fitness FitMin($L_T$) of the top layer $L_T$.

In an embodiment, the elitist pool minimum fitness is not established until the top layer is full. Otherwise, if the earliest entrants into the top layer happen to have excellent fitness, they will block other entrants which might be needed for diversity.

It will be appreciated that since the fitness estimate of individuals is still somewhat uncertain at the time they are being considered for entry into the elitist pool from $L_0$, establishing the minimum entry fitness at exactly FitMin($L_T$) may cull individuals that eventually would have been determined to have an actual fitness which exceeds FitMin($L_T$). In another embodiment, therefore, the minimum fitness for entry into the elitist pool is set at some other fitness level which is a function of FitMin($L_T$). For example, it can be set at 90% of FitMin($L_T$). It will also be appreciated that the accuracy of an individual's fitness estimate improves as the individual progresses up through the experience layers. Another embodiment, therefore, reduces the potential inaccuracy of the elitist pool minimum fitness test by applying it at the entry to one of the higher layers in the elitist pool, rather than at $L_0$. In yet another embodiment, the test is applied more than once, at the entry to more than one of the layers, or all of them. Other variations will be apparent. In general, in embodiments which attempt to cull unfit individuals early, individuals are discarded at the entry to at least one of the experience layers in the elitist pool, if their fitness estimate at that time is less than some function f( ) that depends at least on FitMin($L_T$). Note that the function f( ) need not necessarily be the same for all the layers at which the rule is applied.

Individuals that enter the top layer may themselves undergo further testing on samples in the testing database. With such further experience, the fitness estimate of even those individuals may change. This can introduce a wave effect in the top layer due to fluctuations in fitness estimates of the individual with minimum fitness. This will, in turn, affect the elitist pool minimum fitness if the top layer is at quota. If the fitness estimate of the individual with the minimum fitness in the top layer decreases, then the minimum fitness of the top layer (and hence the entire elitist pool minimum fitness) will decrease. In order to prevent this, in one embodiment, individuals that have reached the top layer do not undergo further testing. The justification here is that individuals in the top layer are assumed to already have fitness estimates which are as representative as possible to their actual fitness. Such an embodiment accepts any remaining error in the fitness estimate because the likelihood that purely random variations at that point would exceed an error range already considered acceptable, is too large.

In one embodiment, individuals are harvested from the entire elitist pool for use against production data. In another embodiment, only individuals that have reached the top layer are subject to harvesting. In either embodiment, further selection criteria can be applied in the harvesting process. Such criteria is usually specific to the application environment, and can include, for example, fitness, consistency, and so on.

Roughly described, a computer-implemented data mining method, for use with a data mining testing database contains a plurality of samples of testing data, the samples being distributed among N>1 segments of the testing data, each of the segments including at least one of the samples and at least one of the segments including more than one of the samples. The method is used with a memory storing a candidate database having a pool of candidate individuals, each i'th one of the candidate individuals identifying a testing experience level, a fitness estimate, a rule set for applying to samples of data in the testing data, and a testing set $TS_i$ of the testing data segments. The method involves testing each individual from the candidate pool on samples of the testing data from the individual's testing set $TS_i$ of testing data segments, updating the fitness estimate associated with each of the individuals being tested in dependence upon results of the testing, updating the testing experience level associated with each of the individuals in dependence upon the number of samples on which the individual is tested, selecting individuals for discarding from the candidate pool in dependence upon their updated fitness estimates, validating each individual whose testing experience level has reached a predetermined maturity level without being selected for discarding, including further testing each such individual on samples of the testing data from a testing data segment other than those in the individual's testing set $TS_i$ and providing for deployment selected ones of the individuals that satisfy predetermined deployment criteria after validation, wherein each of the testing sets $TS_i$ has fewer than all of the N testing data segments and at least one of the testing sets $TS_i$ has different testing data segments than another of the initial testing sets $TS_i$.

BRIEF DESCRIPTION OF THE DRAWINGS

The invention will be described with respect to specific embodiments thereof, and reference will be made to the drawings, in which.

DETAILED DESCRIPTION

Example Embodiment

Figure 1:
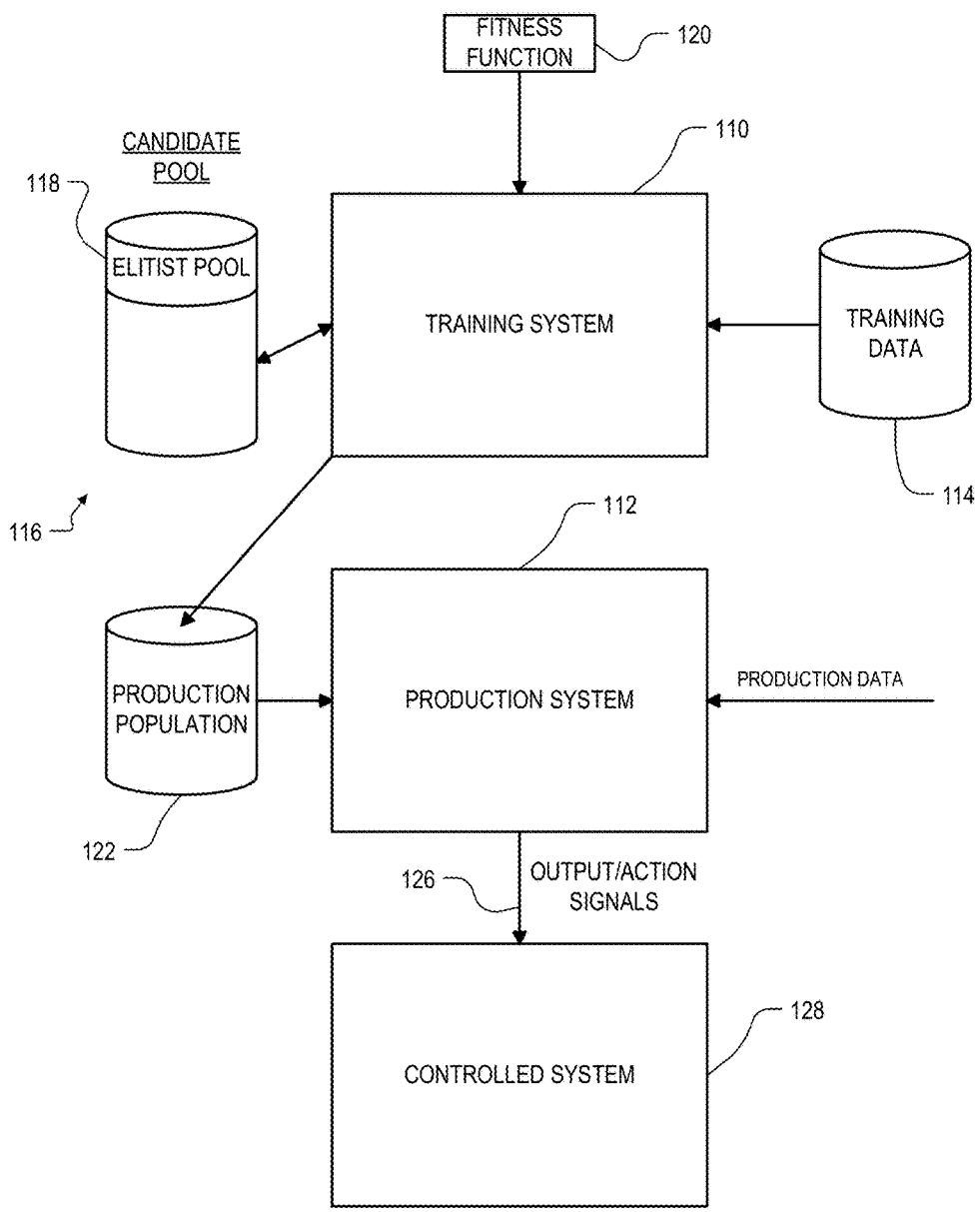
FIG. 1 is an overall diagram of an embodiment of a data mining system incorporating features of the invention.

FIG. 1 is an overall diagram of an embodiment of a data mining system incorporating features of the invention. The system is divided into three portions, a training system 110, a production system 112, and a controlled system 128. The training system 110 interacts with a database 114 containing testing data, as well as with another database 116 containing the candidate pool. As used herein, the term "database" does not necessarily imply any unity of structure. For example, two or more separate databases, when considered together, still constitute a "database" as that term is used herein. The candidate pool database 116 includes a portion 118 containing the elitist pool. The training system 110 operates according to a fitness function 120, which indicates to the training system 110 how to measure the fitness of an individual. The training system 110 optimizes for individuals that have the greatest fitness, however fitness is defined by the fitness function 120. The fitness function is specific to the environment and goals of the particular application. For example, the fitness function may be a function of the predictive value of the individual as assessed against the testing data—the more often the individual correctly predicts the result represented in the testing data, the more fit the individual is considered. In a financial asset trading environment, an individual might provide trading signals (e.g. buy, sell, hold current position, exit current position), and fitness may be measured by the individual's ability to make a profit, or the ability to do so while maintaining stability, or some other desired property. In the healthcare domain, an individual might propose a diagnosis based on patient prior treatment and current vital signs, and fitness may be measured by the accuracy of that diagnosis as represented in the testing data.

The production system 112 operates according to a production gene population in another database 122. The production system 112 applies these individuals to production data 124, and produces outputs 126, which may be action signals or recommendations. In the financial asset trading environment, for example, the production data 124 may be a stream of real time stock prices and the outputs 126 of the production system 112 may be the trading signals or instructions that one or more of the individuals in production gene population 122 outputs in response to the production data 124. In the healthcare domain, the production data 124 may be current patient data, and the outputs 126 of the production system 112 may be a suggested diagnosis or treatment regimen that one or more of the individuals in production gene population 122 outputs in response to the production data 124. The production gene population 122 is harvested from the training system 110 once or at intervals, depending on the embodiment. Preferably, only individuals from elitist pool 118 are permitted to be harvested. In an embodiment, further selection criteria is applied in the harvesting process, such as cross-validation. However, by modifying the embodiments below in accordance with the n-pool cross-validation procedures described herein, a separate cross-validation step after testing and before harvesting can be avoided.

The controlled system 128 is a system that is controlled automatically by the signals 126 from the production system. In the financial asset trading environment, for example, the controlled system may be a fully automated brokerage system which receives the trading signals via a computer network (not shown) and takes the indicated action. Depending on the application environment, the controlled system 128 may also include mechanical systems such as a engines, air-conditioners, refrigerators, electric motors, robots, milling equipment, construction equipment, or a manufacturing plant.

Figure 2:
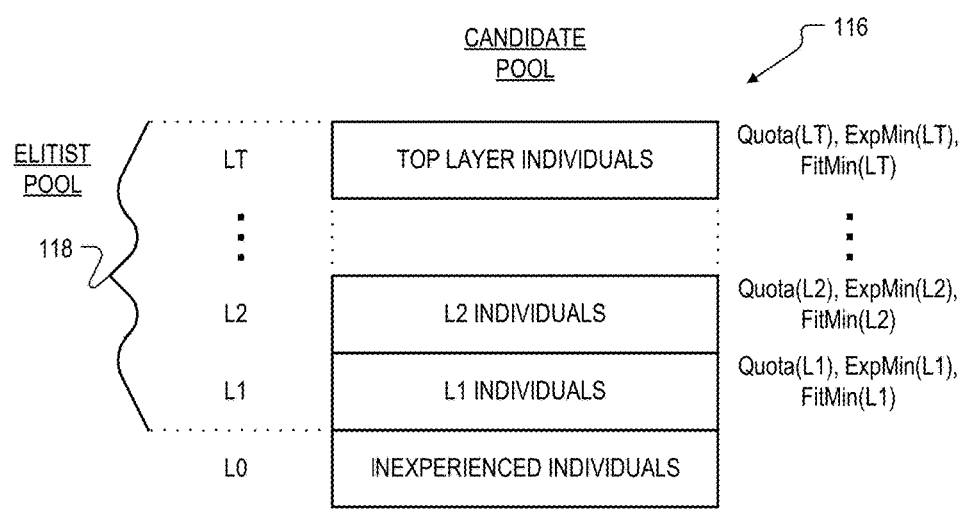
FIG. 2 is a symbolic drawing of the candidate pool in FIG. 1.

FIG. 2 is a symbolic drawing of the candidate pool 116 in FIG. 1. As can be seen, the individuals in the pool are stratified into T+1 "experience layers", labeled $L_0$ through $L_T$. The individuals in $L_0$ are very inexperienced (have been tested on only a relatively small number of samples in testing data 114, if any), whereas the higher layers contain individuals in successively greater experience ranges. The layers $L_1$ through $L_T$ constitute the elitist pool 118 (FIG. 1). Each layer i in the elitist pool 118 has associated therewith three "layer parameters": a quota $Quota(L_i)$ for the layer, a range of experience levels $[ExpMin(L_i) \ldots ExpMax(L_1)]$ for the layer, and the minimum fitness $FitMin(L_i)$ for the layer. For example, an embodiment in the financial asset trading environment may have on the order of 40 or 50 layers in the elitist pool, each containing individuals with experience levels within a range on the order of 4000-5000 trials. The minimum experience level $ExpMin(L_1)$ may be on the order of 8000-10,000 trials, and each layer may have a quota on the order of 100 individuals.

In the embodiment of FIG. 2, the quotas for all the layers in the elitist pool 118 are equal and fixed. Neither is required in another embodiment. In addition, $ExpMin(L_0)=0$ in this embodiment. Also, as the experience ranges of the layers are contiguous, ExpMin of each layer can be inferred as one higher than ExpMax of the next lower layer, or ExpMax of each layer can be inferred as one lower than ExpMin of the next higher layer. Thus only the minimum experience level or the maximum experience level need be specified for each layer. In the embodiment, only the minimum experience levels are specified, and they are specified for layers $L_1$-$L_T$; in another embodiment only the maximum experience levels are specified, and they are specified for layers $L_0$-$L_{T-1}$. In yet another embodiment, the size of the range of experience layers assigned to all the layers is constant, and only one minimum or maximum experience level is specified in the layer parameters; the remainder are calculated algorithmically as needed. Other variations will be apparent.

The FitMin( ) values in FIG. 2 are not specified a priori. Rather, they are filled by copying from the fitness estimate associated with the least fit individual in each layer. Whenever the fitness estimate of the least fit individual is updated, and whenever the least fit individual itself is replaced, the FitMin( ) value associated with the layer is updated correspondingly. The FitMin( ) values are needed for comparing to the fitness estimation of individuals coming up from the next lower layer, and having them associated directly with each layer can simplify this comparison. In another embodiment, each layer can instead contain a pointer to the least fit individual in the layer, and the comparison method can obtain the layer minimum fitness from that individual itself. In general, each layer has associated with it an "indication" of the minimum fitness in the layer. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication".

In one embodiment, the experience layer in candidate pool 116 define separate regions of memory, and the individuals having experience levels within the range of each particular layer are stored physically within that layer. Preferably, however, the experience layers are only implied by the layer parameters and the individuals can actually be located anywhere in memory. In one embodiment, the individuals in candidate pool 116 are stored and managed by conventional database management systems (DBMS), and are accessed using SQL statements. Thus a conventional SQL query can be used to obtain, for example, the fitness estimate of the least fit individual in the highest layer. New individuals can be inserted into the candidate pool 116 using the SQL "insert" statement, and individuals being discarded can be deleted using the SQL "delete" statement. In another embodiment, the individuals in candidate pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list.

Figure 3:
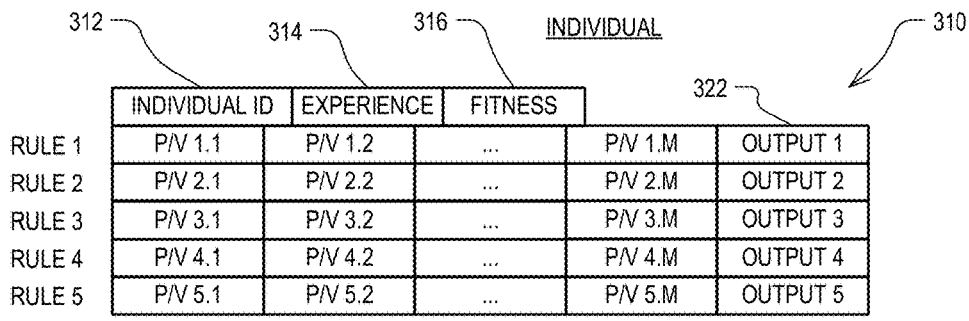
FIG. 3 is a symbolic drawing of an individual in either the candidate pool or the production gene population of FIG. 1.

FIG. 3 is a symbolic drawing of an individual 310 in either the candidate pool 116 or the production gene population 122. As used herein, an "individual" is defined by its contents. An individual created by procreation is considered herein to constitute a different individual than its parents, even though it retains some if its parents' genetic material. In this embodiment, the individual identifies an ID 312, its experience level 314, and its current fitness estimate 316. It also includes one or more "rules" 318, each of which contains one or more conditions 320 and an output 322 to be asserted if all the conditions in a given sample are true. During procreation, any of the conditions or any of the outputs may be altered, or even entire rules may be replaced. The individual's experience level 314 increments by one for each sample of the testing data 114 on which it is tested, and its fitness estimate 316 is determined by fitness function 120, averaged (or otherwise combined) over the all the trials.

A rule is a conjunctive list of indicator-based conditions in association with an output. Indicators are the system inputs that can be fed to a condition. These indicators are represented in the testing database 114, as well as in the production data 124. Indicators can also be introspective, for example by indicating the fitness estimate of the individual at any given moment. In the embodiment of FIG. 1, the individual's conditions are all specified as parameter/value ("P/V") pairs. That is, if in the current sample, the specified parameter has the specified value (or range of values), then the condition is true. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent.

In a financial asset trading embodiment, during testing, an individual can be thought of as a virtual trader that is given a hypothetical sum of money to trade using historical data. Such trades are performed in accordance with a set of rules that define the individual thereby prompting it to buy, sell, hold its position, or exit its position. The outputs of the rules are trading action signals or instructions, such as buy, sell, exit or hold. Rules may also be designed to contain gain-goal and stop-loss targets, thus rendering the exit action redundant. A hold occurs when no rule in the individual is triggered, therefore, the individual effectively holds its current position. The indicators on which the rules are based can be, for example, a time increment ("tick"), or the closing price for a stock day.

The following code defines an example rule in terms of conditions and indicators, as well as the action asserted by the rule, in accordance with one embodiment of the present invention:

if (PositionProfit>=2% and !(tick=(−54/10000)% prev tick and MACD is negative)
and !(tick=(−119/10000)% prev tick and Position is long))
and !(ADX×100<=5052))
then SELL where "and" represents logical "AND" operation, "!" represents logical "NOT" operation, "tick", "MACD" and "ADX" are stock indicators, "SELL" represents action to sell, and "PositionProfit" represents the profit position of the individual.

In a healthcare embodiment, an individual can be thought of as a set of rules predicting a patient's future state, given the patient's current and past state. The outputs of the rules can be proposed diagnoses or proposed treatment regimens that the individual asserts are appropriate given the conditions of the individual's rules. The indicators on which the rules are based can be a patient's vital signs, and past treatment and medication history, for example. An example rule is as follows:

if pulse>=120 and 18<=blood pressure[6]<20 and temp >=104 and surgery duration <22 and clamp on artery and medication=EB45 and last medication >=60 and !white blood cell count [3]<−2.3 and !oxygen level [1]<−1.1-->>>
then thromboembolism @ prob <=0.65

The testing data is arranged in the database 114 as a set of samples, each with parameters and their values, as well as sufficient information to determine a result that can be compared with an assertion made by an individual on the values in the sample. In one embodiment, the result is explicit, for example a number set out explicitly in association with the sample. In such an embodiment, the fitness function can be dependent upon the number of samples for which the individual's output matches the result of the sample. In another embodiment, such as in the financial asset trading embodiment, the result may be only implicit. For example, the sample may include the price of an asset at each tick throughout a trading day, and the training system 110 must hypothetically perform all the trading recommendations made by the individual throughout the trading day in order to determine whether and to what extent the individual made a profit or loss. The fitness function can be dependent upon the profit or loss that the individual, as a hypothetical trader, would have made using the tick data for the sample.

Figure 4:
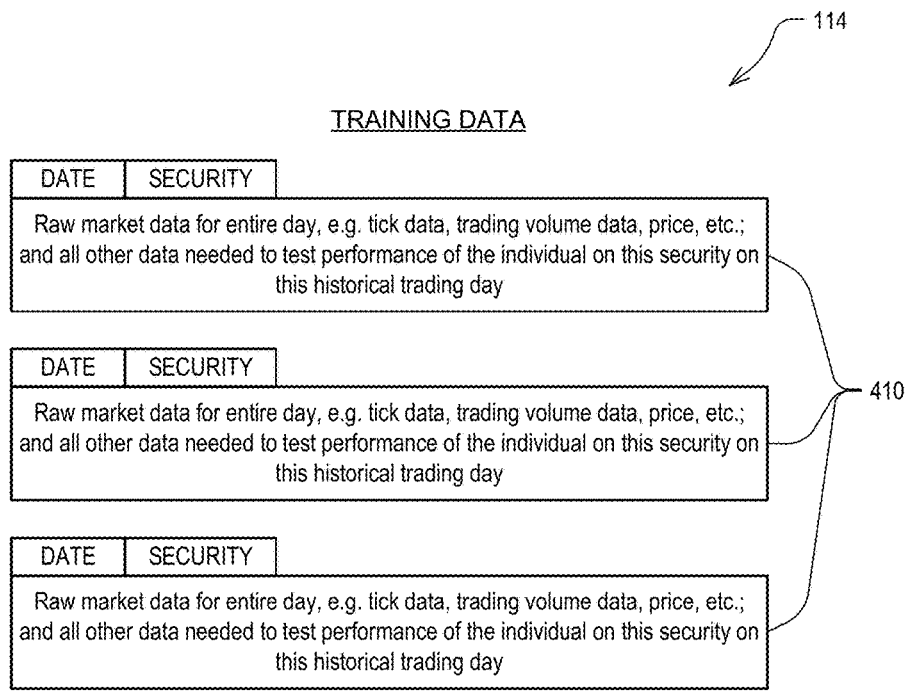
FIG. 4 is a symbolic drawing indicating how the testing data database is organized.

FIG. 4 is a symbolic drawing indicating how the testing data is organized in the database 114. The illustration in FIG. 4 is for the financial asset trading embodiment, and it will be understood how it can be modified for use in other environments. Referring to FIG. 4, three samples 410 are shown. Each sample includes a historical date, an identification of a particular security or other financial asset (such as a particular stock symbol), and raw historical market data for that financial asset on that entire trading day, e.g. tick data, trading volume data, price, etc.; and all other data needed to test performance of the individual's trading recommendations on this asset on this historical trading day. In addition, though not shown in FIG. 4, the testing data is further divided into n segments as described elsewhere herein.

Figure 5:
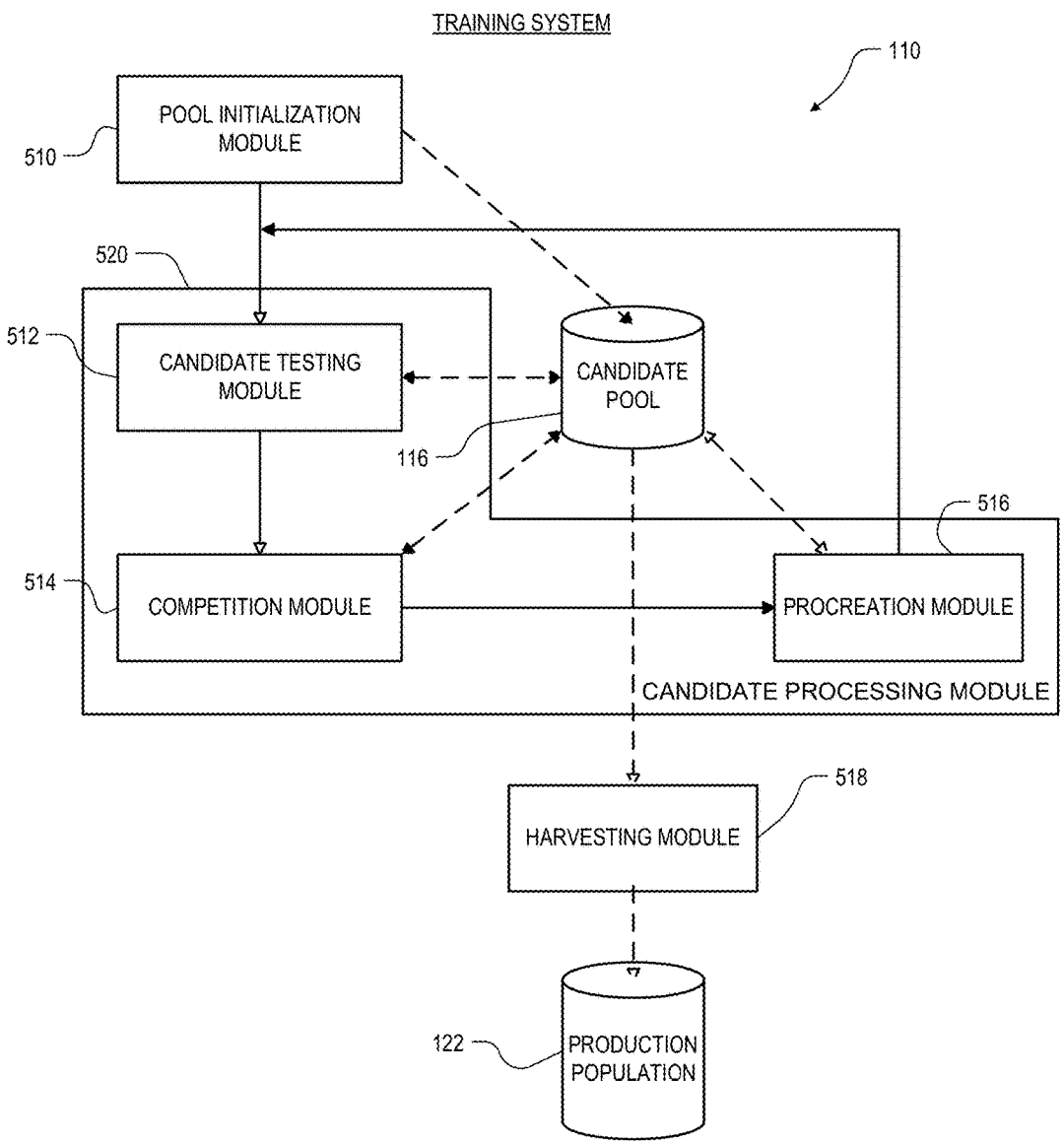
FIG. 5 illustrates modules that can be used to implement the functionality of the training system in FIG. 1.

FIG. 5 illustrates various modules that can be used to implement the functionality of training system 110 (FIG. 1). Candidate pool 116 and production gene population database 122 are also shown in the drawing. Solid lines indicate process flow, and broken lines indicate data flow. The modules can be implemented in hardware or software, and need not be divided up in precisely the same blocks as shown in FIG. 5. Some can also be implemented on different processors or computers, or spread among a number of different processors or computers. In addition, it will be appreciated that some of the modules can be combined, operated in parallel or in a different sequence than that shown in FIG. 5 without affecting the functions achieved. Also as used herein, the term "module" can include "sub-modules", which themselves can be considered herein to constitute modules. In particular, the gene testing module 512, competition module 514, and procreation module 516 are also considered herein to be sub-modules of a candidate pool processor module 520. The blocks in FIG. 5 designated as modules can also be thought of as flowchart steps in a method.

Referring to FIG. 5, the candidate pool 116 is initialized by pool initialization module 510, which creates an initial set of candidate individuals in $L_0$ of the candidate pool 116. These individuals can be created randomly, or in some embodiments a priori knowledge is used to seed the first generation. In another embodiment, individuals from prior runs can be borrowed to seed a new run. At the start, all individuals are initialized with an experience level of zero and a fitness estimate that is undefined.

Gene testing module 512 then proceeds to test the population in the candidate pool 116 on the testing data 114. For the reasons explained above, only those individuals that have not yet reached the top layer $L_T$ of the elitist pool 118 (of which there are none initially) are tested. Each individual undergoes a battery of tests or trials on the testing data 114, each trial testing the individual on one sample 410. In one embodiment, each battery might consist of only a single trial. Preferably, however, a battery of tests is much larger, for example on the order of 1000 trials. In one embodiment, at least the initial battery of tests includes at least ExpMin ($L_1$) trials for each individual, to enable the initial individuals to qualify for consideration for the first layer of the elitist pool 118. Note there is no requirement that all individuals undergo the same number of trials. As described elsewhere herein, each individual is trained on only specific segments of the testing data, then cross-validated on only specific segments of the testing data. After the tests, gene testing module 512 updates the fitness estimate associated with each of the individuals tested.

In an embodiment, the fitness estimate may be an average of the results of all trials of the individual. In this case the "fitness estimate" can conveniently be indicated by two numbers: the sum of the results of all trials of the individual, and the total number of trials that the individual has experienced. The latter number may already be maintained as the experience level of the individual. The fitness estimate at any particular time can then be calculated by dividing the sum of the results by the experience level of the individual. In an embodiment such as this, "updating" of the fitness estimate can involve merely adding the results of the most recent trials to the prior sum.

Next, competition module 514 updates the candidate pool 116 contents in dependence upon the updated fitness estimates. The operation of module 514 is described in more detail below, but briefly, the module considers individuals from lower layers for promotion into higher layers, discards individuals that do not meet the minimum individual fitness of their target layer, and discards individuals that have been replaced in a layer by new entrants into that layer. Candidate pool 116 is updated with the revised contents.

After the candidate pool 116 has been updated, a procreation module 516 evolves a random subset of them. Only individuals in the elitist pool are permitted to procreate. Any conventional or future-developed technique can be used for procreation. In an embodiment, conditions, outputs, or rules from parent individuals are combined in various ways to form child individuals, and then, occasionally, they are mutated. The combination process for example may include crossover—i.e., exchanging conditions, outputs, or entire rules between parent individuals to form child individuals. New individuals created through procreation begin with an experience level of zero and with a fitness estimate that is undefined. These individuals are placed in $L_0$ of the candidate pool 116. Preferably, after new individuals are created by combination and/or mutation, the parent individuals are retained. In this case the parent individuals also retain their experience level and fitness estimates, and remain in their then-current elitist pool layers. In another embodiment, the parent individuals are discarded.

After procreation, gene testing module 512 operates again on the updated candidate pool 116. The process continues repeatedly.

Sometime after the top layer of elitist pool 118 is full, individuals can be harvested for use by production system 112. Gene harvesting module 518 retrieves individuals for that purpose. In one embodiment, gene harvesting module 518 retrieves individuals periodically, whereas in another embodiment it retrieves individuals only in response to user input. Gene harvesting module 518 selects only from the top layer $L_T$, and can apply further selection criteria as well in order to choose desirable individuals. For example, it can select only the fittest individuals from $L_T$, and/or only those individuals that have shown low volatility. Other criteria will be apparent to the reader. The individuals also undergo further validation as part of this further selection criteria, by testing on historical data not part of testing data 114. The individuals selected by the gene harvesting module 518 are written to the production gene population database 122 for use by production system 112 as previously described.

As mentioned, competition module 514 manages the graduation of individuals from lower layers in the candidate pool 116, up to higher layers. This process can be thought of as occurring one individual at a time, as follows. First, a loop is begun through all individuals whose experience level has changed since the last time competition module 514 was executed. If the current individual's experience level has not increased sufficiently to qualify it for the next experience layer in the elitist pool 118, then the individual is ignored and the next one is considered. If the current individual's experience level has increased sufficiently to qualify it for a new experience layer, then the module 514 determines whether the target experience layer is already at quota. If not, then the individual is simply moved into that experience level. If the target layer is full, then the competition module 514 determines whether the fitness estimate of the current individual exceeds that of the least fit individual in the target layer. If so, then the least fit individual is discarded, and the current individual is moved up into the target layer. If not, then the current individual is discarded. The process then moves on to consider the next individual in sequence. Note that while individuals typically move up by only one experience layer at a time, that is not requirement in all embodiments. In some embodiments, such as in a client/server embodiment, it may happen that a particular individual is not considered for advancement within the elitist pool 118 until after its experience level has increased sufficiently for it to jump past one or more experienced layers.

In an embodiment that enforces an elitist pool minimum fitness, the step in which the fitness estimate of the current individual is compared to the minimum fitness of the target layer, can further include a test of whether the current individual's fitness estimate satisfies the elitist pool minimum fitness. Typically this latter test is applied only on individuals graduating out of level 0, but as mentioned previously, could be applied to individuals being considered for other layers in the elitist pool 118 as well. If the current individual does not satisfy the elitist pool minimum fitness, then it is discarded.

The above routine processes individuals sequentially, and different embodiments can implement different sequences for processing the individuals. Note that the processing sequence can affect the results if, for example, an individual in layer $L_i$ is being considered for layer $L_{i+1}$ at the same time that an individual in layer $L_{i-1}$ is being considered for layer $L_i$. If the former test occurs first, then a hole will be opened in layer $L_i$ and the individual graduating from layer $L_{i-1}$ will be promoted into layer $L_i$ automatically. If the latter test occurs first, then the individual graduating from layer $L_{i-1}$ will have to compete for its place in layer $L_i$ (assuming layer $L_i$ is at quota). In another embodiment, individuals are considered layer by layer either according to their target layer after promotion, or according to their current layer prior to promotion. Again, the sequence of individuals to consider within each layer will depend on the embodiment, as will the sequence in which the layers themselves are considered.

Figure 6:
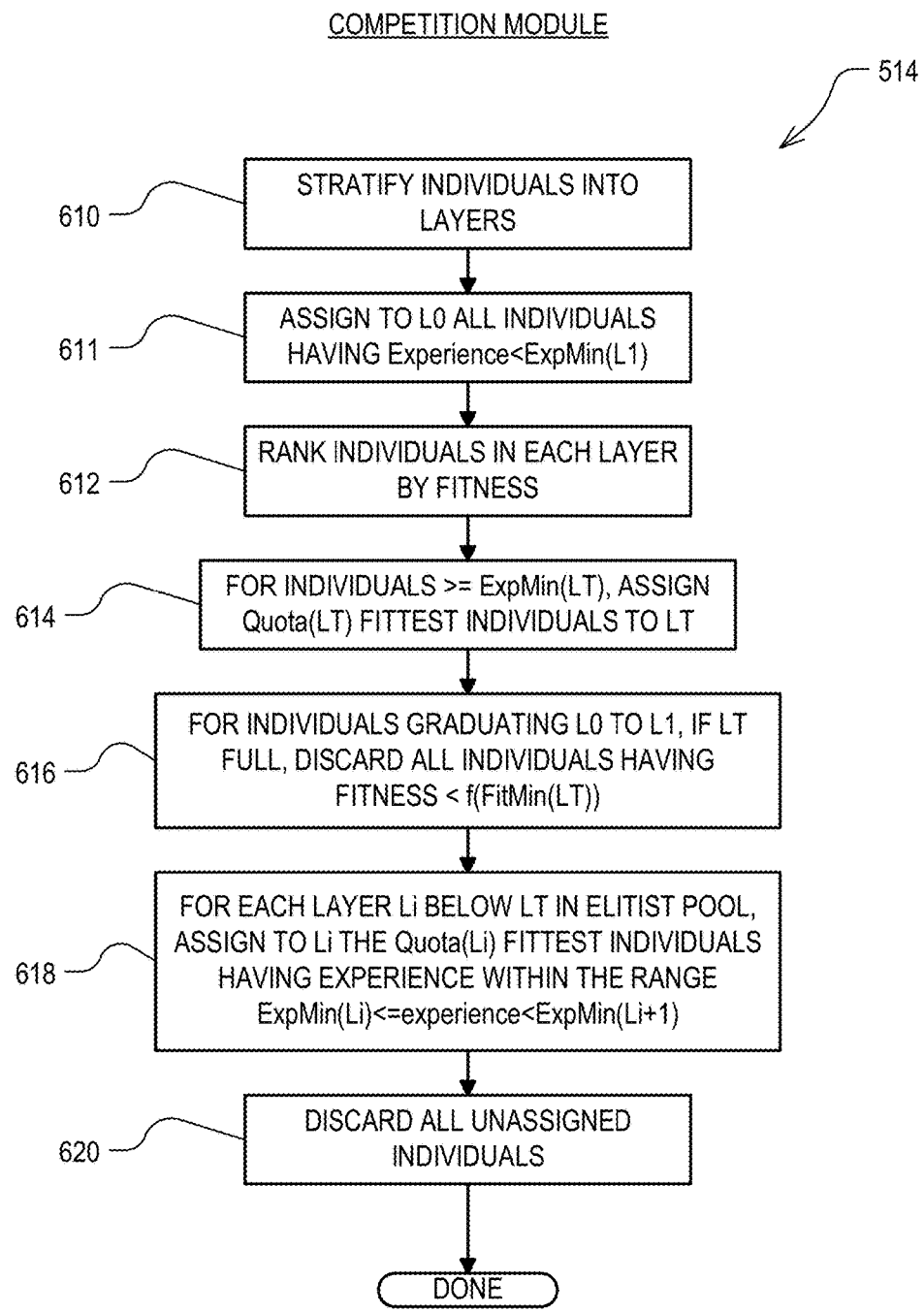
FIG. 6 illustrates a method of operation of the competition module in FIG. 5.

FIG. 6 illustrates a bulk-oriented method of operation of competition module 514. In the embodiment of FIG. 6, the layers in the candidate pool 116 are disbanded and reconstituted each time the competition module 514 executes. These executions of competition module 514 are sometimes referred to herein as competition "events", and each comparison made between the fitness estimate of one individual and that of another is sometimes referred to herein as a comparison "instance".

In step 610, all the individuals in candidate pool 116 are stratified into their experience layers. In step 611, all individuals whose experience level is still within that of $L_0$, are assigned automatically to $L_0$. In step 612, within each experience layer $L_1$-$L_T$, the individuals are ranked according to their fitness estimates. In step 614, of those individuals whose experience level is at least equal to the minimum experience level of the top layer of the elitist pool 118, the Quota($L_T$) fittest are assigned to $L_T$. Note that this step could exclude some individuals with top layer experience, as individuals coming up from layer $L_{T-1}$ can supplant less fit individuals that were previously in $L_T$.

Step 616 implements the policy that once $L_T$ is full, no individuals are allowed into the elitist pool 118 unless they are at least as fit as some predetermined function f( ) of the top layer minimum fitness. In step 616, therefore, if $L_T$ is full, all individuals graduating from $L_0$ to $L_1$ whose fitness estimate is less than f(FitMin($L_T$)) are discarded. Variations of step 616 to implement variations of the elitist pool minimum fitness policy, will be apparent. In step 618, for each layer $L_i$ below the top layer $L_T$, all the individuals in the elitist candidate pool 118 having experience level within the range associated with layer $L_i$ are considered. Of these individuals, only the Quota($L_i$) fittest individuals are assigned to layer $L_i$. In step 620, all individuals remaining in elitist candidate pool 118 which were not assigned to specific layers in steps 611, 614 or 618, are discarded.

As used herein, a phrase such as "only the five fittest individuals", need not necessarily fill all five places. That is, if there are only three individuals to consider, the phrase is satisfied if all three individuals are assigned places. Thus it can be seen that step 618 includes both a policy that individuals entering a layer that is already at quota must compete for their place in that layer, as well as a policy that individuals entering a layer that is not yet full are promoted to that layer automatically. It can also be seen that steps 618 and 620 together implement a policy that fitness comparisons are made only among individuals having roughly the same experience.

Figure 7:
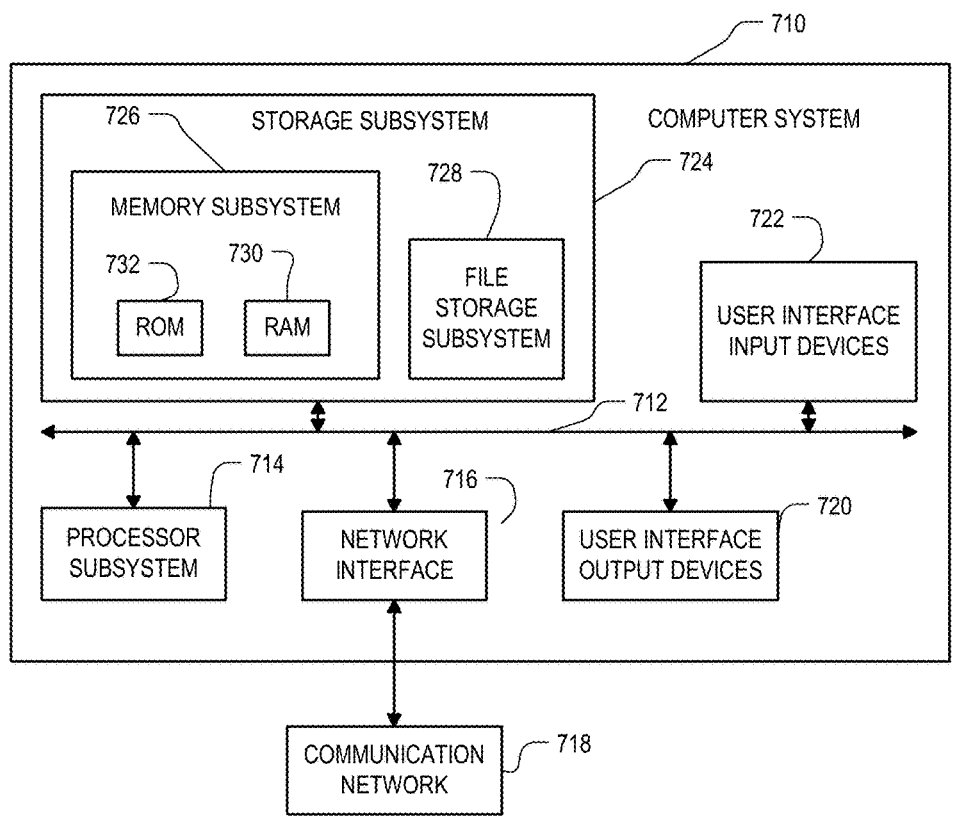
FIG. 7 is a simplified block diagram of a computer system that can be used to implement either or both of the training system or production system in FIG. 1, and/or the training server and clients in FIG. 8.

FIG. 7 is a simplified block diagram of a computer system 710 that can be used to implement training system 110, production system 126, or both. While FIGS. 1, 5, 6 and 9 indicate individual components for carrying out specified operations, it will be appreciated that each component actually causes a computer system such as 710 to operate in the specified manner.

Computer system 710 typically includes a processor subsystem 714 which communicates with a number of peripheral devices via bus subsystem 712. These peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks, including an interface to communication network 718, and is coupled via communication network 718 to corresponding interface devices in other computer systems. Communication network 718 may comprise many interconnected computer systems and communication links. These communication links may be wireline links, optical links, wireless links, or any other mechanisms for communication of information. While in one embodiment, communication network 718 is the Internet, in other embodiments, communication network 718 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 722 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 710 or onto computer network 718.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system. In particular, an output device of the computer system 710 on which production system 112 is implemented, may include a visual output informing a user of action recommendations made by the system, or may include a communication device for communicating action signals directly to the controlled system 128. Additionally or alternatively, the communication network 718 may communicate action signals to the controlled system 128. In the financial asset trading environment, for example, the communication network 718 transmits trading signals to a computer system in a brokerage house which attempts to execute the indicated trades.

Storage subsystem 724 stores the basic programming and data constructs that provide the functionality of certain embodiments of the present invention. For example, the various modules implementing the functionality of certain embodiments of the invention may be stored in storage subsystem 724. These software modules are generally executed by processor subsystem 714. Storage subsystem 724 also stores the candidate pool 116, the testing database 114, and/or the production gene population 122. Alternatively, one or more of such databases can be physically located elsewhere, and made accessible to the computer system 710 via the communication network 718.

Memory subsystem 726 typically includes a number of memories including a main random access memory (RAM) 730 for storage of instructions and data during program execution and a read only memory (ROM) 732 in which fixed instructions are stored. File storage subsystem 728 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 728. The host memory 726 contains, among other things, computer instructions which, when executed by the processor subsystem 714, cause the computer system to operate or perform functions as described herein. As used herein, processes and software that are said to run in or on "the host" or "the computer", execute on the processor subsystem 714 in response to computer instructions and data in the host memory subsystem 726 including any other local or remote storage for such instructions and data.

Bus subsystem 712 provides a mechanism for letting the various components and subsystems of computer system 710 communicate with each other as intended. Although bus subsystem 712 is shown schematically as a single bus, alternative embodiments of the bus subsystem may use multiple busses.

Computer system 710 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 710 depicted in FIG. 7 is intended only as a specific example for purposes of illustrating the preferred embodiments of the present invention. Many other configurations of computer system 710 are possible having more or less components than the computer system depicted in FIG. 7.

Client/Server Embodiment

In some environments, the testing data used to evaluate an individual's fitness can be voluminous. Therefore, even with modern high processing power and large memory capacity computers, achieving quality results within a reasonable time is often not feasible on a single machine. A large candidate pool also requires a large memory and high processing power. In one embodiment, therefore, a client/server model is used to provide scaling in order to achieve high quality evaluation results within a reasonable time period. Scaling is carried out in two dimensions, namely in pool size as well as in evaluation of the same individual to generate a more diverse candidate pool so as to increase the probability of finding fitter individuals. In the client/server embodiment, the candidate pool is distributed over a multitude of clients for evaluation. Each client continues to evaluate its own client-centric candidate pool using data from testing database 114, which it may receive in bulk or periodically on a sustained and continuing basis. Individuals that satisfy one or more predefined conditions on a client computer are transmitted to the server to form part of a server-centric candidate pool.

Distributed processing of individuals also may be used to increase the speed of evaluation of a given individual. To achieve this, individuals that are received by the server but have not yet been tested on a certain number of samples, or have not yet met one or more predefined conditions, may be sent back from the server to a multitude of clients for further evaluation. The evaluation result achieved by the clients (alternatively called herein as partial evaluation) for an individual is transferred back to the server. The server merges the partial evaluation results of an individual with that individual's fitness estimate at the time it was sent to the clients to arrive at an updated fitness estimate for that individual in the server-centric candidate pool. For example, assume that an individual has been tested on 500 samples and is sent from the server to, for example, two clients each instructed to test the individual on 100 additional samples. Accordingly, each client further tests the individual on the additional 100 samples and reports its own client-centric fitness estimate to the server. The server combines these two estimates with the individual's fitness estimate at the time it was sent to the two clients to calculate an updated server-centric fitness estimate for the individual. The combined results represent the individual's fitness evaluated over 700 days. In other words, the distributed system, in accordance with this example, increases the experience level of an individual from 500 samples to 700 samples using only 100 different testing samples at each client. A distributed system, in accordance with the present invention, is thus highly scalable in evaluating its individuals.

Advantageously, clients are enabled to perform individual procreation locally, thereby improving the quality of their individuals. Each client is a self-contained evolution device, not only evaluating the individuals in its own pool, but also creating a new generation of individuals and moving the evolutionary process forward locally. Thus clients maintain their own client-centric candidate pool which need not match each other's or the server-centric candidate pool. Since the clients continue to advance with their own local evolutionary process, their processing power is not wasted even if they are not in constant communication with the server. Once communication is reestablished with the server, clients can send in their fittest individuals to the server and receive additional individuals from the server for further testing.

Figure 8:
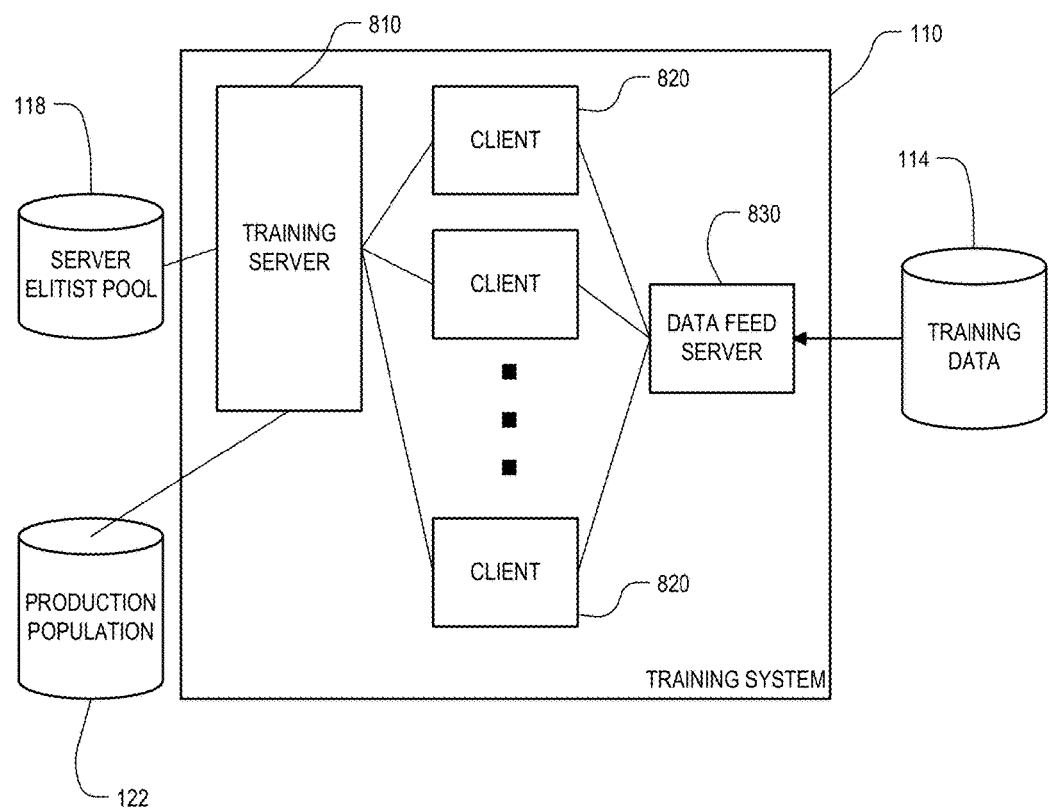
FIG. 8 is a high-level block diagram of an example embodiment of the training system of FIG. 1 using a network computing system.

FIG. 8 is a high-level block diagram of an example embodiment of training system 110 implemented using a network computing system. The training system 110 includes a plurality of client computers 820 (sometimes referred to herein simply as "clients") and a training server computer 810. Server 810 may itself be a central or a distributed server. A client computer 820 may be a laptop computer, a desktop computer, a cellular/VoIP handheld computer or smart phone, a tablet computer, distributed computer, or the like. An example system may have hundreds of thousands of clients. Clients are assigned to subsets of one or more (but fewer than all) of the testing data segments as described elsewhere herein. In an embodiment, the training server and/or each of the client computers can have the structure of FIG. 7, or any of its variations as described above. The client computers 820 communicate with the training sever 810 to receive individuals for testing, and to report tested individuals back to the training server 810. The training server 810 maintains a server-centric experience-layered elitist pool 118, but in an embodiment, does not maintain any candidate individuals below layer $L_1$ of the elitist pool. New individuals are created by clients, both during initialization and by procreation, and they are not reported to the training server 810 until they have been tested on sufficient numbers of samples to qualify for the server's elitist pool 118. The number of individuals created by the clients 820 may vary depending on the memory size and the CPU processing power of the client. For example, in one embodiment, a client may have 1000 individuals for evaluation. Each client computer 820 further has a communication port to access one or more data feed servers 830, which retrieve and forward testing samples from the testing database 114 to the client computers 820. Alternatively, although not shown, the testing samples may be supplied from data feed server 830 to the clients 820 via the training server 810.

In one embodiment, clients obtain their testing data by making a request to the data feed servers 830, and indicating in the request the client's assigned testing data segment. The data feed servers 830 respond by forwarding only testing samples from the indicated testing data segment. In an embodiment in which clients are assigned to evaluate material from a testing data "set" $TS_i$ of M of the testing data segments, as described further below, where M can be greater than 1, the client's requests indicate one or more the testing data segments to which they are assigned, or indicate the client's assigned testing set number $TS_i$ in the request. The data feed servers 830 respond by forwarding only testing samples from one or more of the indicated testing data segment or segments.

Figure 9:
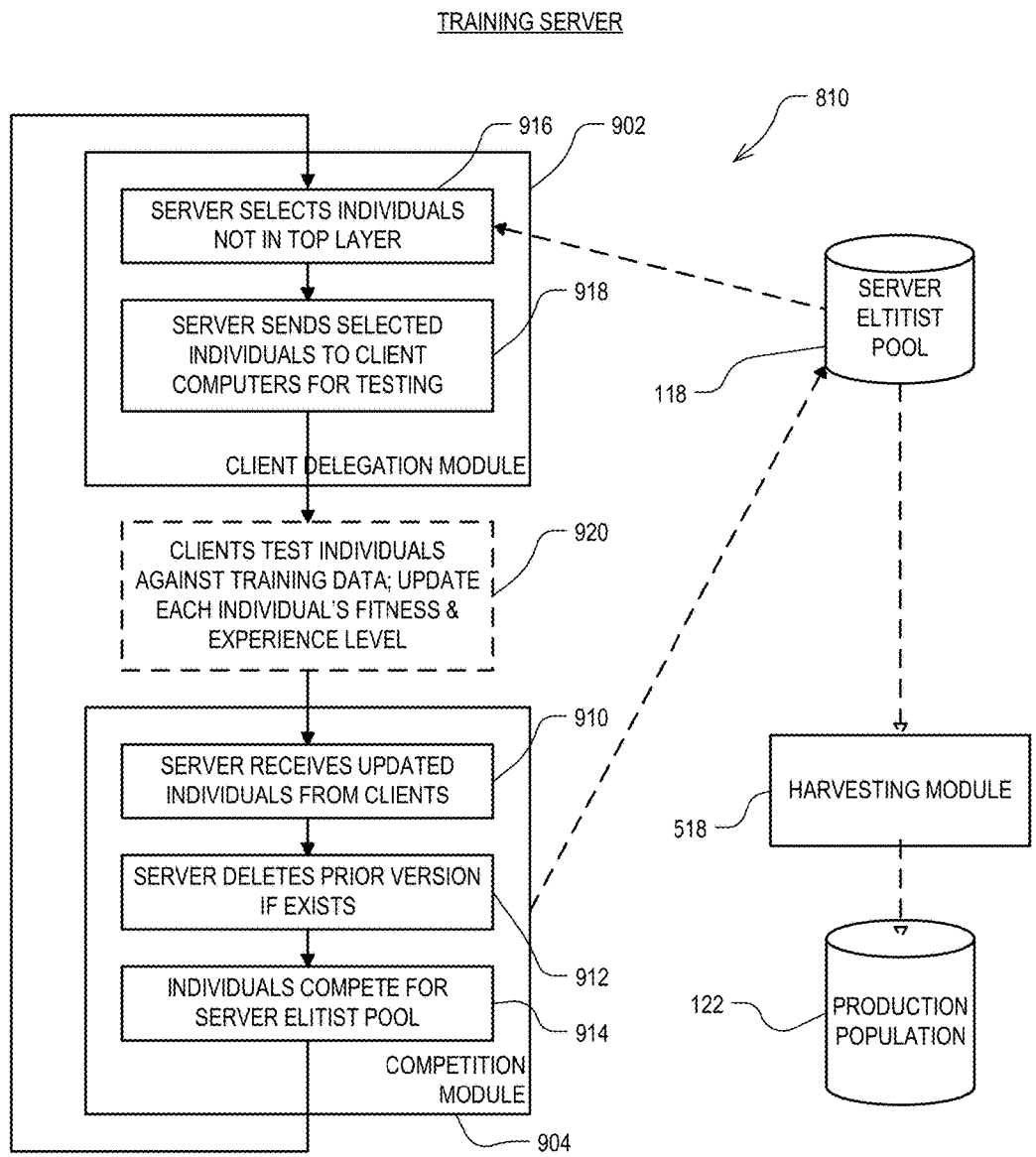
FIG. 9 illustrates modules that can be used to implement the functionality of training server of FIG. 8.

FIG. 9 illustrates various modules that can be used to implement the functionality of training server 810 (FIG. 8). Elitist pool 118 and production gene population database 122 are also shown in the drawing. As in the embodiment of FIG. 5, solid lines in FIG. 9 indicate process flow, and broken lines indicate data flow. The implementation variations mentioned above with respect to the embodiment of FIG. 5 apply to FIG. 9 as well.

In the operation of the client/server model, the training server 810 does not perform any testing or procreation itself. It does, however, enforce competition within its own server-centric elitist pool 118 when individuals are returned from clients. FIG. 9 illustrates various modules that can be used to implement the functionality of training server 810. Like the embodiment of FIG. 5, the training server 810 includes a competition module 904. It also includes gene harvesting module 518, which may be same as in FIG. 5. It also includes gene testing and procreation functionality, but these are combined into a single client delegation module 902 in FIG. 9. The client delegation module 902 and the competition module 904 constitute two sub-modules in a candidate pool processor module (not shown specifically in FIG. 9). The FIG. 9 embodiment does not include a pool initialization module in the sense of FIG. 5, since as mentioned, the clients initialize their own individual pools.

Referring to FIG. 9, in step 910, the competition module 904 receives individuals from one or more of the client computers 820. These individuals may arrive asynchronously, if and when client computers have them available to transmit. They may arrive out-of-order, and some individuals previously sent out for testing may never return. Individuals may arrive individually, or in bunches. At various times determined by competition module 904, after at least one individual has arrived, competition module 904 proceeds to step 912 to begin a competition "event".

In step 912, competition module 904 determines whether each incoming individual is a new one, or a return of an individual that the server previously sent out for testing. This determination can be made on the basis of individual IDs 312 (FIG. 3). If the latter, then the training server 810 replaces its prior copy of the individual with the one newly received. This step may involve merely updating the experience level and the fitness estimation of the prior copy of the individual in the server-centric elitist pool 118. If in step 912, the competition module 904 determines that the incoming individual is a new one, then in step 914 the incoming individual competes for its position in the server elitist pool 118. The same rules of competition apply here as they do for the competition module 514 in the server-only model. That is, the fitness estimate of the incoming individual is compared to the least fit individual in the now-appropriate experience layer for the incoming individual, and only the fitter of the two is retained. The other is discarded. An elitist pool minimum fitness policy can be applied here as well, based on a server-centric minimum fitness level. Alternatively, the entire server elitist pool 118 can be disbanded and reconstituted at each competition event, as described in more detail with respect to FIG. 6.

In the client delegation module 902, in step 916, the server 810 selects individuals from the server-centric elitist pool 118, and sends them out to one or more clients 820 for further testing (step 918). The selection of server-centric individuals for the destination client depends on the data segment(s) assigned to the client as described elsewhere herein. As in the server-only embodiment, the client delegation module 902 is restricted from selecting for further testing individuals already in the top layer of the elitist pool 118. In one embodiment, the battery of trials that an individual is to undergo is dictated by the training server. In such an embodiment, the server-centric view of the battery is the same as the client-centric view of the battery. In another embodiment, the battery of trials that an individual is to undergo is left to the client to decide, and client may perform more than one battery of trials on the individual before returning it to the server. In the latter embodiment, the client has its own client-centric view of a testing battery, and the server-centric view of the battery is unimportant.

In step 920 the client machines 820 test the individuals against testing data from the data feed server 830, and update each individual's fitness and experience level locally. Step 920 is shown in broken lines in FIG. 9 because it is performed by clients rather than training server 810. At various subsequent times, the server 810 again receives back updated individuals from the clients in step 910, and repeats the process of FIG. 9.

The operation of the client computers 820 is the same as that previously described with respect to FIGS. 5 and 6, with the exception that individuals are provided both by the pool initialization module 510, as well as from the training server 810. The candidate pool 116 in a client computer 820 is client-centric, and includes all candidate individuals being considered by the clients, including those that do not yet have sufficient experience to be considered for the elitist pool in the client computer. The candidate pool in the clients are layer-oriented as shown in FIG. 2, and for convenience, the layers in a client computer are sometimes designated herein with a top layer numbered CT rather than T, and with layers designated $CL_0$-$CL_{CT}$. None of the layer parameters in the client-centric candidate pool, including the number of layers, need be the same as their corresponding parameters in other clients or in the server. Preferably the candidate pool 116 in the client computers 820 are implemented using linked lists, whereas the elitist pool 118 in the server 810 are implemented using a DBMS, both as previously described.

Unlike the single server embodiment, the gene testing module in the client computer 820 does not prevent further testing of individuals that have reached the top layer $CL_{CT}$ of the client-centric elitist pool 820. The gene harvesting module in a client computer 820 selects individuals only from the top layer $CL_{CT}$ of the client computer 820 for transmitting back to the server 810. Since the server 810 does not maintain any individuals that do not qualify for the server-centric elitist pool 118, the minimum experience level of the top layer $CL_{CT}$ in the client-centric elitist pool on each client computer 820 must be at least as high as the minimum experience level of the lowest layer $L_1$ of the elitist pool 118 of the training server 810. Preferably the minimum experience level of the top layer $CL_{CT}$ in the client-centric elitist pool on each client computer 820 is equal to the minimum experience level of the lowest layer $L_1$ of the elitist pool 118 of the training server 810.

Note that because of procreation on the client system 820, individuals may be sent up to the training server 810 which the training server 810 had never before seen. Such individuals are handled in step 914 (FIG. 9), by requiring them to compete for their position in the server-centric elitist pool 118 of the training server 810. Note further that because of competition in the client computer 820, some individuals that the training server 810 sent to the client computer 820 for further testing will never be returned to the training server 810. In this case the prior copy of the individual, retained by the training server 810, remains in place in the elitist pool 118 of the training server 810 unless and until it is displaced through competition in the training server 810 (step 914). Still further, note that an individual retained in the training server 810 after it has also been sent to a client 820 for further testing, may become displaced and deleted from the elitist pool 118 in the training server 810 through competition in the training server 810 (step 914). In this case, if the same individual is returned by the client computer 820, the training server 810 simply ignores it.

n-Pool Evolution

The testing data is split into n segments. A top layer minimum experience level is determined for each segment, which we shall call the "segment maturity experience level". For each segment s, the segment maturity experience level is sometimes referred to herein as $ML_s$. Clients are each assigned one of the testing data segments by the server. Clients only evolve their respective individuals on their assigned data segment.

Each individual being sent to the server is tagged with the ID of the testing data segment it has been evolved upon (i.e., the "originating segment"). The server only sends individuals with an experience level less than the segment maturity experience level to clients assigned to the data segment the individual has been tagged with.

Upon merging the client-reported evaluation of an individual with the original individual in the server pool, if the experience level becomes greater or equal to the segment maturity experience level, it is tagged and no longer sent to the clients assigned to the originating segment. Such individuals, we shall call evolved individuals.

The server sends evolved individuals down to clients that are not assigned to the individual's originating segment (i.e., "non-originating segments") for further evaluation. Any client receiving an evolved individual only evaluates and reports the individual's performance but does not consider evolved individuals for its elitist pool and so the genetic material from evolved individuals are never used in individuals evolving on other testing data segments.

Upon merging the client-reported evaluation of an evolved individual with the original individual in the server pool, if the experience level becomes greater or equal to the segment maturity experience level for the reporting client's assigned segment, it is tagged, and no longer sent to the clients assigned to that segment.

Once an evolved individual has been evaluated upon all n segments, if its performance is acceptable on the non-original segments, it is said to have generalized sufficiently and can be harvested.

In an embodiment, this method can avoid the need for a separate process for validating evolved individuals on out-of-sample data, as that step is already built into the normal workflow of the testing process.

The method also significantly reduces sensitivity to any selection bias on the testing set by allowing n originating segments, each to act as a testing set for a subset of the individuals.

The method allows for much more effective use of the data set, removing the requirement to always 'hide' part of the data from any testing to be used as the out-of-sample set.

Generalization of any evolved individual is much more reliable as its respective out-of-sample evaluation set is n−1 times larger than the evolved set.

One of the drawbacks to the system just described is that the single fold of data on which the individuals are trained is fixed throughout testing, with no overlap. This means that there is a chance that the testing pools associated with each data segment may converge relatively quickly, and the diversity of data is not translated into a diversity of genotypic solutions. In other words, if the data segments are small enough, there is a risk that individuals with the same source segment evolve to local optima much quicker than if we'd trained on the entire data set.

To combat this problem, a server designates each client to evaluate material from M different sub-segments, where M is less than the total number of data segments in the system (often <½). Individuals originating from such a client are also marked as originating from all of the segments available to the client. Testing continues until the maturity experience level for all of its M folds is reached. At this point validation can then begin on the remaining N-M segments, by sending the individual back down to clients designated to sub-segment pair unseen by the individual so far.

In an embodiment, M is considered only a maximum for a given data set. An individual client can be assigned any number of folds from 1 to M.

By doing so, we have many more permutations of the data sub-segments assigned as originating segments, and the segments have overlaps.

For instance, rather than dividing the data set to a fixed 4 segments, we can divide it to 8 sub-segments, and assign each client two of the possible permutations of the sub-segments, which would be a total of 8×7=56 possible pairs to be used as originating segments.

Note that an n-Pool evolution system can work in concert with the class-based model, in which, roughly described, client computers are each assigned to a class with each class being defined by a subset of indictors with respect to which individuals are trained. After sufficient evaluation, client computers send fit individuals to the server, which can then send the individuals out for further evaluation, but only to those clients assigned to the same class from which the individual originated. Accommodations are made for merging classes, too, when appropriate.

Note also that n-Pool evolution does not necessarily require a client/server arrangement. In a unified arrangement (such as on a single machine), testing data can be similarly divided into n data segments, and individuals can be divided into groups similar to the assignment of clients to M data segments. The single processor merely restricts itself to testing each individual group on only the M data segment or segments to which the group is assigned. It also validates the individuals in each group on only the other N-M data segments.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the claims and their equivalents.

The invention claimed is:

1. A computer-implemented method, for use with a testing database containing a plurality of samples of testing data, the samples being distributed among N>1 segments of the testing data, each of the segments including at least one of the samples and at least one of the segments including more than one of the samples, for use further with a memory storing a candidate database having a pool of candidate individuals, each i'th one of the candidate individuals identifying a testing experience level, a fitness estimate, a rule set for applying to samples of data in the testing data, and a respective testing set $TS_i$ of the testing data segments, the method comprising:

for each i'th one of the candidate individuals:
assigning to the i'th individual the respective testing set $TS_i$ of the testing data segments,
a computer system testing the i'th individual on samples of the testing data from the i'th individual's testing set $TS_i$ of testing data segments,
updating the fitness estimate associated with the i'th individual in dependence upon results of the testing, and
updating the testing experience level associated with the i'th individual in dependence upon the number of samples on which the i'th individual is tested;
selecting individuals for discarding from the candidate pool in dependence upon a competition among candidate individuals;
forming new individuals in the candidate pool by procreation in dependence upon a respective set of at least one parent individual from the candidate pool;
a computer system validating, without further procreation as part of the validating step, a plurality of evolved individuals whose testing experience level has reached a predetermined maturity level without being selected for discarding, including further testing each such individual on samples of the testing data from a testing data segment other than those in the individual's testing set $TS_i$; and providing for deployment selected ones of the individuals in the plurality of evolved individuals that satisfy predetermined deployment criteria after validation, wherein each of the testing sets $TS_i$ has fewer than all of the N testing data segments and at least one of the testing sets $TS_i$ has different testing data segments than another of the initial testing sets $TS_i$.

2. The method of claim 1, wherein the validating step is performed without selecting for discarding any of the evolved individuals in the plurality of evolved individuals.

3. The method of claim 1, wherein each of the segments of the testing data includes more than one of the samples.

4. The method of claim 1, wherein each of the testing sets $TS_i$ contains exactly one of the testing data segments.

5. The method of claim 1, wherein each of the samples in the testing data in each of the segments comprises a plurality of data entries, and wherein testing each individual on samples of the testing data comprises, for each particular sample:

classifying each of the entries in the particular sample in dependence upon the rules in the individual; and scoring the individual's performance on the particular sample in dependence upon all the classifications performed by the individual on data entries in the particular sample.

6. The method of claim 1, wherein each s'th one of the segments has associated therewith a respective segment maturity experience level $ML_s$.

7. The method of claim 6, wherein all of the $ML_s$ are equal.

8. The method of claim 1, for use in a server infrastructure with respect to a collection of at least one client device, further comprising assigning each of the client devices to one of the testing sets $TS_i$, not all of the client devices being assigned to any single one of the testing sets $TS_i$, wherein testing each individual from the candidate pool on samples of the testing data from the individual's testing set $TS_i$ of testing data segments, comprises delegating testing of the individual to a client device assigned to the testing subset $TS_i$.

9. The method of claim 8, wherein further testing each such individual on samples of the testing data from a testing data segment other than those in the individual's testing set $TS_i$, comprises delegating further testing of the individual to a client device assigned to a testing subset that does not overlap with any testing subset on which the individual was tested.

10. A computer-implemented system, for use with a testing database containing a plurality of samples of testing data, the samples being distributed among N>1 segments of the testing data, at least one of the segments including more than one of the samples, comprising:

a memory storing a candidate database having a pool of candidate individuals, each i'th one of the candidate individuals identifying a testing experience level, a fitness estimate, a rule set for applying to samples of data in the testing data, and a respective testing set $TS_i$ of the testing data segments; and a training system which:

for each i'th one of the candidate individuals:

assigns to the i'th individual the respective testing set $TS_i$ of the testing data segments, tests the i'th individual on samples of the testing data from the i'th individual's testing set $TS_i$ of testing data segments, updates the fitness estimate associated with the i'th individual in dependence upon results of the testing, and updates the testing experience level associated with the i'th individual in dependence upon the number of samples on which the i'th individual is tested;

selects individuals for discarding from the candidate pool in dependence upon a competition among candidate individuals;

forms new individuals in the candidate pool in dependence upon a respective set of at least one parent individual from the candidate pool;

validates a plurality of evolved individuals whose testing experience level has reached a predetermined maturity level without being selected for discarding, including further testing each such individual on samples of the testing data from a testing data segment other than those in the individual's testing set $TS_i$ without forming any new individuals in the candidate pool in dependence upon the individuals in the plurality of evolved individuals; and provides for deployment selected ones of the individuals that satisfy predetermined deployment criteria after validation, wherein each of the testing sets $TS_i$ has fewer than all of the N testing data segments and at least one of the testing sets $TS_i$ has different testing data segments than another of the initial testing sets $TS_i$.

11. The computer-implemented system of claim 10, wherein each of the segments of the testing data includes more than one of the samples.

12. The computer-implemented system of claim 10, wherein each of the testing sets $TS_i$ contains exactly one of the testing data segments.

13. The computer-implemented system of claim 10, wherein each of the samples in the testing data in each of the segments comprises a plurality of data entries, and wherein in testing each individual on samples of the testing data comprises, for each particular sample the training system:

classifies each of the entries in the particular sample in dependence upon the rules in the individual; and scores the individual's performance on the particular sample in dependence upon all the classifications performed by the individual on data entries in the particular sample.

14. The computer-implemented system of claim 10, wherein the predetermined maturity level is equal for all of the testing data segments.

15. The computer-implemented system of claim 10, for use in a server infrastructure with respect to a collection of at least one client device, wherein the training system further assigns each of the client devices to one of the testing sets $TS_i$, not all of the client devices being assigned to any single one of the testing sets $TS_i$, wherein in testing each individual from the candidate pool on samples of the testing data from the individual's testing set $TS_i$ of testing data segments, the server infrastructure sends the individual to a client device assigned to the testing subset $TS_i$.

16. The computer-implemented system of claim 15, wherein in further testing each such individual on samples of the testing data from a testing data segment other than those in the individual's testing set $TS_i$, the server infrastructure sends the individual to a client device assigned to a testing subset that does not overlap with any testing subset on which the individual was tested.

17. A computer-implemented data mining system, for use with a data mining testing database containing a plurality of samples of testing data, the samples being distributed among N>1 segments of the testing data, at least one of the segments including more than one of the samples, comprising:
    a memory storing a candidate database having a pool of candidate individuals, each i'th one of the candidate individuals identifying a testing experience level, a fitness estimate, a rule set for applying to samples of data in the testing data, and a testing set $TS_i$ of the testing data segments;
    a training system including:
        a testing module which tests each individual from the candidate pool on samples of the testing data from the individual's testing set TSi of testing data segments,
        an updating module which updates the fitness estimate associated with each of the individuals being tested in dependence upon results of the testing, and which updates the testing experience level associated with each of the individuals in dependence upon the number of samples on which the individual is tested,
        a competition module which selects individuals for discarding from the candidate pool in dependence upon a competition among candidate individuals,
        a validation module which validates evolved individuals without further procreation, including further testing each such evolved individual on samples of the testing data from a testing data segment other than those in the evolved individual's testing set $TS_i$, the evolved individuals being individuals whose testing experience level on samples of testing set $TS_i$ has reached a predetermined maturity level without being selected for discarding; and
    a deployment module which provides for deployment selected ones of the individuals that satisfy predetermined deployment criteria after validation,
    wherein each of the testing sets $TS_i$ has fewer than all of the N testing data segments and at least one of the testing sets $TS_i$ has different testing data segments than another of the initial testing sets $TS_i$.

18. The system of claim 17, wherein the validation module validates the evolved individuals also without subjecting them to further competition among individuals.

19. A computer-implemented method, for use with a testing database containing a plurality of samples of testing data, the samples being distributed among N>1 segments of the testing data, each of the segments including at least one of the samples and at least one of the segments including more than one of the samples,
    for use further with a memory storing a database having a pool of evolved individuals, each i'th one of the evolved individuals identifying a testing experience level, a fitness estimate, a rule set for applying to samples of data in the testing data, and having already reached a predetermined maturity level of testing experience on a respective testing set $TS_i$ of the testing data segments without having been selected for discarding, the method comprising:
    for each i'th one of the evolved individuals, and without further procreation in dependence upon any of the evolved individuals, performing validation steps of:
        further testing the i'th evolved individual on samples of the testing data from a testing data segment other than those in the individual's testing set $TS_i$, and
        updating the fitness estimate associated with the i'th evolved individual in dependence upon results of the testing; and
    providing for deployment selected ones of the evolved individuals in the pool of evolved individuals that satisfy predetermined deployment criteria after validation,
    wherein each of the testing sets $TS_i$ has fewer than all of the N testing data segments and at least one of the testing sets $TS_i$ has different testing data segments than another of the initial testing sets $TS_i$.

20. The method of claim 19, wherein the validation steps are performed further without selecting for discarding any of the evolved individuals in dependence upon comparisons among the evolved individuals.

21. A computer-implemented method, for use in a server infrastructure with respect to a collection of at least one client device, for use further with a testing database containing a plurality of samples of testing data, the samples being distributed among N>1 segments of the testing data, at least one of the segments including more than one of the samples,
    wherein each i'th one of the client devices is associated with a corresponding testing set $TS_i$ of at least one but fewer than all of the testing data segments, at least one of the testing sets $TS_i$ having different testing data segments than another of the testing sets $TS_i$, the method comprising:
    storing accessibly to the server infrastructure a database identifying a plurality of evolved individuals, each j'th one of the evolved individuals identifying a testing experience level, a fitness estimate, a rule set for applying to samples of data in the testing data, and all of the testing data segments on which the j'th individual has already reached a predetermined maturity level without being selected for discarding, each of the evolved individuals in the plurality of evolved individuals having already reached a predetermined maturity level on at least one of the testing data segments without having been selected for discarding;
    delegating each j'th one of the evolved individuals, to an i'th one of the client devices whose corresponding testing set $TS_i$ includes at least one testing data segment on which the j'th individual has not yet reached a predetermined maturity level, validation testing of the j'th individual on one or more of the testing data segments on which the j'th individual has not yet reached a predetermined maturity level; and
    providing for deployment selected ones of the evolved individuals that satisfy predetermined deployment criteria after validation.

22. The method of claim 21, wherein validation of each j'th evolved individual on a particular testing data segment includes, before any further procreation in dependence upon the j'th evolved individual:
    testing the j'th evolved individual on samples of the testing data from the particular testing data segment; and
    reporting back to the server infrastructure performance of the j'th evolved individual in the testing, and an updated testing experience level for the j'th individual in dependence upon the number of samples on which the j'th individual was tested in the testing.

23. The method of claim 21, wherein validation of each j'th evolved individual on a particular testing data segment includes, before any further selection of any of the evolved individuals for discarding in dependence upon comparisons involving the evolved individuals:
   testing the j'th evolved individual on samples of the testing data from the particular testing data segment; and
   reporting back to the server infrastructure performance of the j'th evolved individual in the testing, and an updated testing experience level for the j'th individual in dependence upon the number of samples on which the j'th individual was tested in the testing.

24. The method of claim 21, comprising, before the providing for deployment of a particular one of the evolved individuals in the plurality of evolved individuals, performing the delegating step with the particular evolved individual a sufficient number of times until the particular evolved individual has reached a predetermined maturity level on all of the testing data segments.

25. The method of claim 21, wherein the predetermined maturity levels are equal for all of the testing data segments.

26. The method of claim 21, wherein storing accessibly to the server infrastructure a database identifying a plurality of evolved individuals comprises:
   providing a plurality of candidate individuals;
   assigning to each k'th individual in the plurality the respective testing set $TS_k$ of the testing data segments;
   for each k'th one of the candidate individuals in the plurality of candidate individuals:
      delegating to a client associated with testing set $TS_k$ testing of the k'th individual on samples of the testing data from testing set $TS_k$,
      updating the fitness estimate associated with the k'th individual in dependence upon results of the testing on samples of the testing data from testing set $TS_k$,
      updating the testing experience level associated with the k'th individual in dependence upon the number of samples of the testing data from testing set $TS_k$ on which the k'th individual was tested,
      selecting individuals for discarding from the candidate pool in dependence upon a competition among candidate individuals, and
      performing the steps of delegating, updating the fitness estimate, updating the testing experience level and selecting individuals for discarding, a sufficient number of times until the k'th candidate individual either reaches a predetermined maturity level or is selected for discarding in the step of selecting individuals for discarding, whichever occurs first.

27. A computer-implemented method, for use by an particular client device in a system including a server infrastructure and a collection of at least one client device including the particular client device, for use further with a testing database containing a plurality of samples of testing data, the samples being distributed among N>1 segments of the testing data, at least one of the segments including more than one of the samples, comprising:
   associating the particular client device with a particular testing set $TS_p$ of at least one but fewer than all of the testing data segments;
   storing accessibly to the particular client device a database identifying a plurality of candidate individuals, each identifying a testing experience level, a fitness estimate, and a rule set for applying to samples of data in the testing data;
   performing, a number T≥1 times, training steps of:
      for each i'th one of the candidate individuals:
         testing the i'th individual on samples of the testing data from the particular testing set of testing data segments;
         updating the fitness estimate associated with the i'th individual in dependence upon results of the testing; and
         updating the testing experience level associated with the i'th individual in dependence upon the number of samples on which the i'th individual is tested,
      selecting individuals for discarding from the candidate pool in dependence upon a competition among candidate individuals, and
      forming new individuals in the candidate pool in dependence upon a respective set of at least one parent individual from the candidate pool not selected for discarding;
   receiving evolved individuals for validation; and
   for each j'th one of the evolved individuals received, and before any further procreation in dependence upon the j'th evolved individual:
      testing the j'th evolved individual on samples of the testing data from the particular testing set of testing data segments, and
      reporting results of the testing to the server infrastructure.

28. The method of claim 27, wherein the steps performed for each j'th one of the evolved individuals received, are performed also before any further selection of any of the evolved individuals for discarding in dependence upon comparisons involving the received evolved individuals.

29. The method of claim 27, further comprising the particular client device receiving from a data feed server the data samples of the testing data on which individuals are tested in the training steps and in the step of testing the j'th evolved individual, in response to one or more requests made by the particular client device for the data samples.

30. The method of claim 29, wherein at least one of the requests made by the particular client device for the data samples identifies for the data feed server at least one of the data segments in the particular testing set $TS_p$ with which the particular client device is associated.

31. The method of claim 29, wherein at least one of the requests made by the particular client device for the data samples identifies for the data feed server the particular testing set $TS_p$ with which the particular client device is associated.

* * * * *